United States Patent
Wang et al.

(10) Patent No.: US 9,456,411 B2
(45) Date of Patent: Sep. 27, 2016

(54) TRANSMISSION POINT SELECTION

(75) Inventors: Xiaoyi Wang, Wheeling, IL (US); Chunli Wu, Beijing (CN); Peter Skov, Beijing (CN)

(73) Assignee: Nokia Solutions and Networks Oy, Espoo (FI)

(*) Notice: Subject to any disclaimer, the term of this patent is extended or adjusted under 35 U.S.C. 154(b) by 0 days.

(21) Appl. No.: 14/386,052

(22) PCT Filed: Mar. 19, 2012

(86) PCT No.: PCT/CN2012/072551
§ 371 (c)(1),
(2), (4) Date: Sep. 18, 2014

(87) PCT Pub. No.: WO2013/138984
PCT Pub. Date: Sep. 26, 2013

(65) Prior Publication Data
US 2015/0079980 A1    Mar. 19, 2015

(51) Int. Cl.
*H04W 4/00* (2009.01)
*H04W 48/20* (2009.01)
*H04B 7/02* (2006.01)
*H04B 7/06* (2006.01)

(52) U.S. Cl.
CPC ............ *H04W 48/20* (2013.01); *H04B 7/024* (2013.01); *H04B 7/0626* (2013.01)

(58) Field of Classification Search
CPC .... H04W 48/20; H04B 7/024; H04B 7/0626
See application file for complete search history.

(56) References Cited

U.S. PATENT DOCUMENTS

| | | | | |
|---|---|---|---|---|
| 2009/0010218 A1* | 1/2009 | Tervonen | .......... | H04W 72/1278 370/329 |
| 2012/0184301 A1* | 7/2012 | Jovicic | ................ | G01S 5/0081 455/456.5 |
| 2013/0028109 A1* | 1/2013 | Jongren | ................ | H04W 24/10 370/252 |
| 2013/0121185 A1* | 5/2013 | Li | ........................ | H04W 72/046 370/252 |
| 2014/0241260 A1* | 8/2014 | Schmidt | .............. | H04W 76/023 370/329 |

FOREIGN PATENT DOCUMENTS

| | | |
|---|---|---|
| CN | 102291211 A | 12/2011 |
| CN | 102291737 A | 12/2011 |
| EP | 2725845 A1 | 4/2014 |
| WO | WO 2011/055940 A2 | 5/2011 |
| WO | WO 2011/115421 A2 | 9/2011 |
| WO | WO 2012/134565 A1 | 10/2012 |

OTHER PUBLICATIONS

3GPP TSG RAN WG1 Meeting #63bis, Dublin, Ireland, Jan. 17-21, 2011, R1-110573, "Views on Tel-11 CoMP", ZTE, 2 pgs.
(Continued)

*Primary Examiner* — Erin File
(74) *Attorney, Agent, or Firm* — Harrington & Smith

(57) ABSTRACT

This disclosure relates to selection of transmission points in a communication system. Information of potential reference signals is sent from a network element to a mobile device to configure the mobile device for measurement of at least one received signal characteristic of the indicated potential reference signals. The mobile device then performs measurement on the indicated potential reference signals and sends to the network element information of at least one port selected by the mobile device based on the measurement.

31 Claims, 4 Drawing Sheets

(56) References Cited

OTHER PUBLICATIONS

Lee, Daewon, et al., "Coordinated Multipoint Transmission and Reception in LTE-Advanced: Deployment Scenarios and Operational Challenges", IEEE Communications Magazine, Feb. 2012, pp. 148-155.

R1-113051; MediaTek Inc.; "Point Selection and CSI Feedback for CoMP Operation"; 3GPP TSG-RAN WG1 #66bis; Zhuhai, China, Oct. 10-Oct. 14, 2011.

R1-120033; Huawei, et al.; "Management of CoMP Measurement Set"; 3GPP TSG RAN WG1 meeting #68; Dresden, Germany, Feb. 6-10, 2012.

* cited by examiner

| | CSI reference signal configuration | Number of CSI reference signals configured | | | | | |
|---|---|---|---|---|---|---|---|
| | | 1 or 2 | | 4 | | 8 | |
| | | $(k',l')$ | $n_s \bmod 2$ | $(k',l')$ | $n_s \bmod 2$ | $(k',l')$ | $n_s \bmod 2$ |
| Frame structure type 1 and 2 | 0 | (9,5) | 0 | (9,5) | 0 | (9,5) | 0 |
| | 1 | (11,2) | 1 | (11,2) | 1 | (11,2) | 1 |
| | 2 | (9,2) | 1 | (9,2) | 1 | (9,2) | 1 |
| | 3 | (7,2) | 1 | (7,2) | 1 | (7,2) | 1 |
| | 4 | (9,5) | 1 | (9,5) | 1 | (9,5) | 1 |
| | 5 | (8,5) | 0 | (8,5) | 0 | | |
| | 6 | (10,2) | 1 | (10,2) | 1 | | |
| | 7 | (8,2) | 1 | (8,2) | 1 | | |
| | 8 | (6,2) | 1 | (6,2) | 1 | | |
| | 9 | (8,5) | 1 | (8,5) | 1 | | |
| | 10 | (3,5) | 0 | | | | |
| | 11 | (2,5) | 0 | | | | |
| | 12 | (5,2) | 1 | | | | |
| | 13 | (4,2) | 1 | | | | |
| | 14 | (3,2) | 1 | | | | |
| | 15 | (2,2) | 1 | | | | |
| | 16 | (1,2) | 1 | | | | |
| | 17 | (0,2) | 1 | | | | |
| | 18 | (3,5) | 1 | | | | |
| | 19 | (2,5) | 1 | | | | |
| Frame structure type 2 only | 20 | (11,1) | 1 | (11,1) | 1 | (11,1) | 1 |
| | 21 | (9,1) | 1 | (9,1) | 1 | (9,1) | 1 |
| | 22 | (7,1) | 1 | (7,1) | 1 | (7,1) | 1 |
| | 23 | (10,1) | 1 | (10,1) | 1 | | |
| | 24 | (8,1) | 1 | (8,1) | 1 | | |
| | 25 | (6,1) | 1 | (6,1) | 1 | | |
| | 26 | (5,1) | 1 | | | | |
| | 27 | (4,1) | 1 | | | | |
| | 28 | (3,1) | 1 | | | | |
| | 29 | (2,1) | 1 | | | | |
| | 30 | (1,1) | 1 | | | | |
| | 31 | (0,1) | 1 | | | | |

Fig. 5

TRANSMISSION POINT SELECTION

TECHNICAL FIELD

This disclosure relates to selection of transmission points in a communication system.

DESCRIPTION OF THE RELATED ART

A communication system can be seen as a facility that enables communication sessions between two or more entities such as fixed or mobile communication devices, base stations, servers, machine type communication devices and/or other communication nodes. A communication system and compatible communicating entities typically operate in accordance with a given standard or specification which sets out what the various entities associated with the system are permitted to do and how that should be achieved. For example, the standards, specifications and related protocols can define the manner how various aspects of communication such as access to the communication system and feedback messaging shall be implemented between communicating devices. A communication can be carried on wired or wireless carriers. In a wireless communication system at least a part of communications between stations occurs over a wireless link.

Examples of wireless systems include public land mobile networks (PLMN) such as cellular networks, satellite based communication systems and different wireless local networks, for example wireless local area networks (WLAN). A wireless system can be divided into cells or other radio coverage or service areas provided by a station. Radio service areas can overlap, and thus a communication device in an area can send signals to and receive signals from more than one station. A more detailed example of wireless systems is an architecture standardized by the 3rd Generation Partnership Project (3GPP) and referred to as the long-term evolution (LTE) of the Universal Mobile Telecommunications System (UMTS) radio-access technology. A further development of the LTE is often referred to as LTE-Advanced. The various development stages of the 3GPP LTE specifications are referred to as releases.

A communication system can be accessed by means of an appropriate communication device. A communication device of a user is often referred to as user equipment (UE) or terminal. A communication device is provided with an appropriate signal receiving and transmitting arrangement for enabling communications with other parties. Typically a communication device is used for enabling receiving and transmission of communications such as speech and data. In wireless systems a communication device provides a transceiver station that can communicate with another communication device such as e.g. a base station and/or another user equipment.

More advanced transmission schemes can become increasingly desirable with the technical evolution. For example, it has been proposed that a node may communicate simultaneously on a plurality of carriers. Multipoint schemes such as Coordinated Multi-Point Transmission (CoMP) have been proposed to provide this. Coordinated multipoint transmission (CoMP) is a technique where combined results of reception by a plurality of stations from a communication device or reception of a transmission based on signals transmitted from a plurality of sources can be utilised. CoMP can be provided for example in heterogeneous network scenarios. In such arrangement a centralised processing unit controlling the relevant cells is also provided.

A possible CoMP scenario is where one cell manages a multiple of geometrically separated transmission/reception (Tx/Rx) points. This scenario is often referred to a CoMP scenario 4. In this scenario intra-cell channel state information (CSI) measurement and feedback is provided. CoMP in accordance with scenarios 1/2/3 requires an inter-cell CSI part. Channel state information reference signal (CSI-RS) resource can be configured in cell-agnostic manner to support the CSI feedback for intra-cell and inter-cell cases. The current assumption is that one CSI-RS resource is for one transmission (Tx) point but one user equipment (UE) can be configured for multiple CSI-RS resources.

However, a network element such as 3GPP enhanced NodeB (eNB) shall have information of the rough location of a user equipment (UE) and configure the CSI-RS resources corresponding to surrounding Tx points accordingly. The location information should not be obtained by means of the CSI feedback itself as this could cause a chicken-egg problem. On the other hand, if the UE needs to perform detection for the CSI-RS resource, there are 80 ms maximum periodicity*resource elements (REs) per subframe=1600 times for one CSI-RS sequence. This can be too complex for an UE to implement. Also, this may cause too much delay even if a UE is capable of doing this.

A proposal is to use CSI-RS based Reference Signal Received Power (RSRP) reports to assist an eNB to select the points for UEs. However, this requires an UE to report a large number of RSRPs if the number of Tx points within one cell is large. This proposal also suffers from the chicken-egg problem because multiple CSI-RS resources needs to be configured so that a UE can do RSRP measurement, this necessitating the eNB to have at least a rough awareness of the UE location already at this stage.

It is noted that the above discussed issues are not limited to any particular communication environment, but may occur in any communication system where transmission points may need to be selected.

SUMMARY OF THE INVENTION

Embodiments of the invention aim to address one or several of the above issues.

In accordance with an embodiment there is provided a method for selection of transmission points, comprising sending to a mobile device information of potential reference signals to configure the mobile device for measurement of at least one received signal characteristic of the indicated potential reference signals, and receiving information of at least one port selected by the mobile device based on the measurement configuration.

In accordance with an embodiment there is provided a method for selection of transmission points, comprising receiving at a mobile device information of potential reference signals, performing measurement on the indicated potential reference signals, and sending to a network element information of at least one port selected by the mobile device based on the measurement.

In accordance with an embodiment there is provided an apparatus for transmission point selection, the apparatus comprising at least one processor, and at least one memory including computer program code, wherein the at least one memory and the computer program code are configured, with the at least one processor, to cause sending to a mobile device information of potential reference signals to configure the mobile device for measurement of at least one received signal characteristic of the indicated potential reference signals, and to receive information of at least one port selected by the mobile device based on the measurement configuration.

In accordance with an embodiment there is provided an apparatus for transmission point selection, the apparatus comprising at least one processor, and at least one memory including computer program code, wherein the at least one memory and the computer program code are configured, with the at least one processor, to receive information of potential reference signals, perform measurement on the indicated potential reference signals, select at least one port based on the measurement, and cause sending to a network element information of the selected at least one port.

In accordance with a more detailed aspects, the information of potential reference signals comprises potential channel state information reference signals resources or ports.

In accordance with an embodiment, the information of potential reference signals may also comprises at least one of time domain periodicity of reference signal resources, reference signal subframe offset search space, a reference signal sequence, transmission point selection criteria, maximum number of ports to report, number of ports associated with a transmission point, and an antenna pattern based on a transmission point with most antennae.

The time domain periodicity of the reference signal resources may be represented by an index mapping to a different periodicity. The time domain periodicity of the reference signal resources may be selected to be the longest periodicity of all transmission points in a relevant area. The reference signal subframe offset search space may be defined by a bitmap, the bitmap being of a predefined length or defined based on the time domain periodicity. Information of the transmission point selection criteria may comprise a range of acceptable path loss and/or definition of an acceptance window.

The at least one received signal characteristic may comprise received signal power and/or quality.

The measurement may comprise measuring the at least one characteristic for each of the indicated reference signal by measuring only one port per a resource element. Alternatively, the at least one characteristic may be measured for each of the indicated reference signal by measuring multiple ports per a resource element.

Only a part of ports indicated by information of potential reference signals may be measured depending on the frame structure.

One or more ports with the strongest reception power may be selected.

Measurements from a multiple of ports may be combined.

The apparatuses may be provided and the methods implemented in a node for a communication system.

A computer program comprising program code means adapted to perform the methods may also be provided.

BRIEF DESCRIPTION OF THE DRAWINGS

Various other aspects and further embodiments are also described in the following detailed description and in the attached claims.

The invention will now be described in further detail, by way of example only, with reference to the following examples and accompanying drawings, in which:

FIG. 5 shows a Table in relation to an example.

DETAILED DESCRIPTION OF THE PREFERRED EMBODIMENT

Certain exemplifying embodiments are explained below with reference to a wireless or mobile communication system serving mobile communication devices. Before explaining in detail the exemplifying embodiments, certain general principles of a wireless communication system and mobile communication devices are briefly explained with reference to FIGS. 1 to 3 to assist in understanding the technology underlying the described examples.

Figure 1:
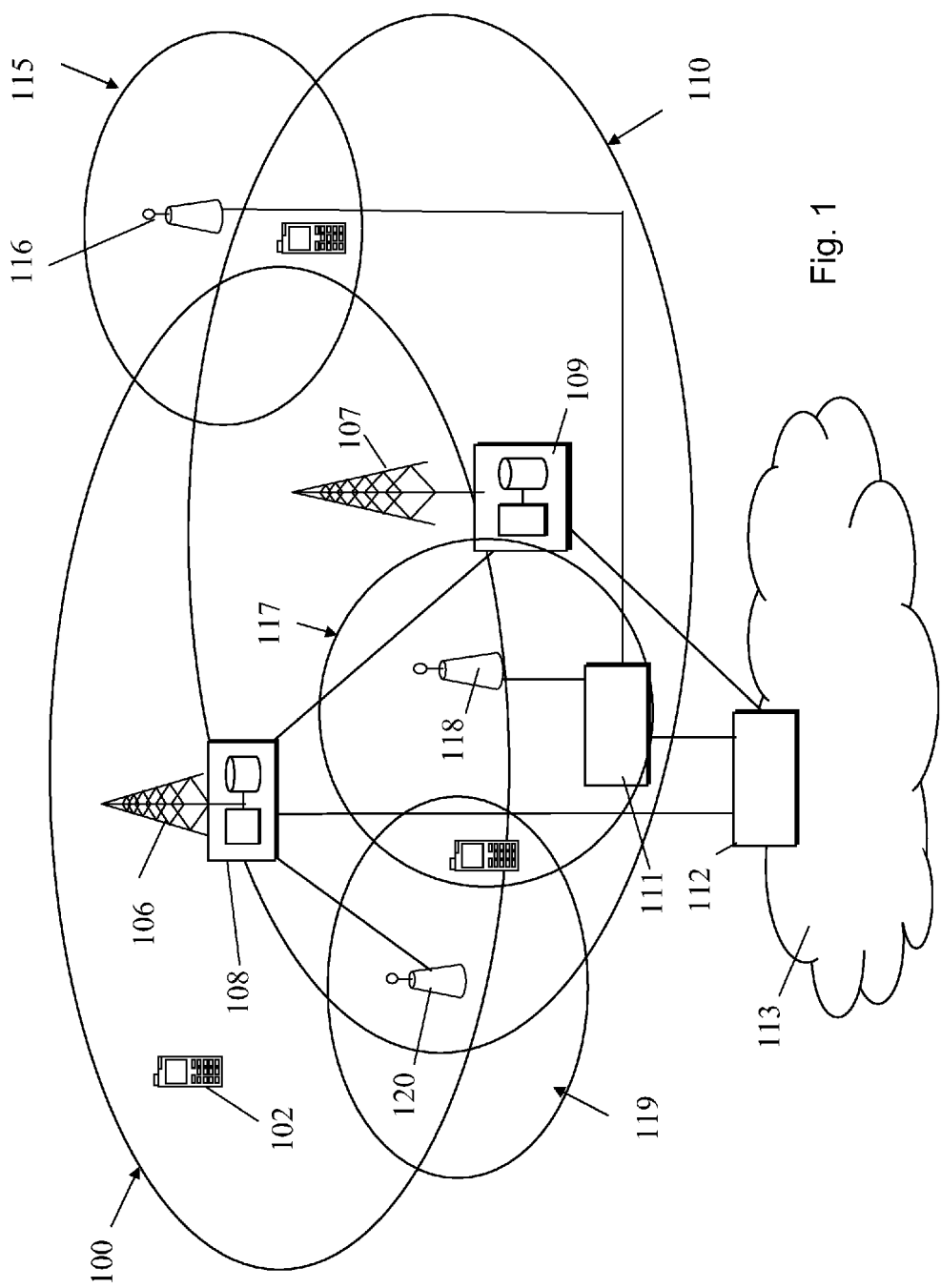
FIG. 1 shows a schematic diagram of a system where some embodiments are applicable.

In a wireless communication system mobile communication devices or user equipment (UE) 102 are provided wireless access via at least one base station or similar wireless transmitting and/or receiving node or point. The example of FIG. 1 shows overlapping access systems or radio service areas 100 and 110 of a cellular system and smaller radio service areas 117 and 119 provided by base stations 106, 107, 118 and 120. For example, in the LTE the transmission/reception points can comprise wide area network nodes such as macro eNode B (eNB) which may, for example, provide coverage for an entire cell or similar radio service area. Network nodes can also be small or local radio service area network nodes, for example Home eNBs (HeNB), pica eNodeBs (pico-eNB), or femto nodes. Some applications may utilise radio remote heads (RRH) that are connected to, for example, an eNB. The smaller radio service areas can be located wholly or partially within the larger radio service area. The nodes of the smaller radio service areas may be configured to support local offload. The local nodes can also, for example, be configured to extend the range of a cell. A mobile communication device may thus be located within, and thus communicate with, more than one radio station and the communication devices and stations may have one or more radio channels open at the same time and may send signals to and/or receive signals from more than one source.

It is noted that the number of radio service areas and their borders are schematically shown for illustration purposes only in FIG. 1. It shall also be understood that the sizes and shapes of radio service areas may vary considerably from the shapes of FIG. 1. A base station site can provide one or more cells. A base station can also provide a plurality of sectors, for example three radio sectors, each sector providing a cell or a subarea of a cell. All sectors within a cell can be served by the same base station.

Base stations are typically controlled by at least one appropriate controller apparatus so as to enable operation thereof and management of mobile communication devices in communication with the base stations. In FIG. 1 control apparatus 108 and 109 is shown to control the respective macro level base stations 106 and 107. It is noted that more than one macro level base station may be controlled e.g. by control apparatus 108. The control apparatus of a base station can be interconnected with other control entities. The control apparatus is typically provided with memory capacity and at least one data processor. The control apparatus and functions may be distributed between a plurality of control units.

In FIG. 1 stations 106 and 107 are shown being connected to a wider communications network 113 via gateway 112. A further gateway function may be provided to connect to another network. The smaller area stations 118 and 120 can also be connected to the network 113, for example by a separate gateway function and/or via the controllers of the macro level stations. In the example, station 118 is connected via a gateway 111 whilst station 120 can provide a remote radio head that connects via the controller apparatus 108.

Figure 2:
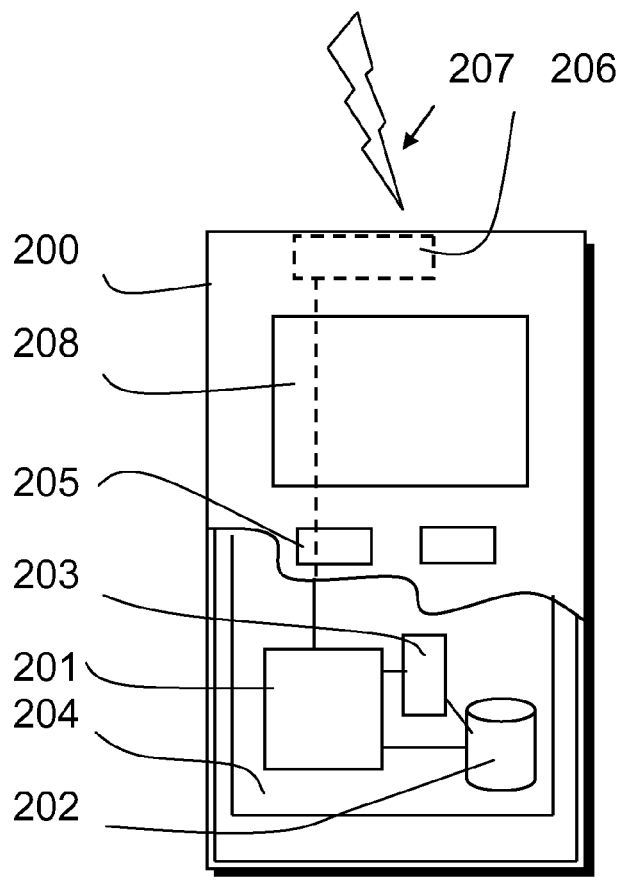
FIG. 2 shows a schematic diagram of a mobile communication device according to some embodiments.

FIG. 2 is a schematic, partially sectioned view of a possible mobile communication device 200 for communication with the stations. Such a communication device is often referred to as user equipment (UE) or terminal. An appropriate mobile communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Non-limiting examples of the content include various downloads, television and radio programs, videos, advertisements, various alerts and other information. The mobile device 200 may receive signals over an air interface 207 via appropriate apparatus for receiving and may transmit signals via appropriate apparatus for transmitting radio signals. In Figure transceiver apparatus is designated schematically by block 206. The transceiver apparatus 206 may be provided for example by means of a radio part and associated antenna arrangement. The antenna arrangement may be arranged internally or externally to the mobile device. A wireless communication device can be provided with a Multiple Input/Multiple Output (MIMO) antenna system.

A mobile device is also typically provided with at least one data processing entity 201, at least one memory 202 and other possible components 203 for use in software and hardware aided execution of tasks it is designed to perform, including control of access to and communications, such as communication of data and control signals with access systems and other communication devices. The apparatus can be adapted to provide measurement to detect and/or select radio points, determination of appropriate radio points and reporting thereof of the embodiments described in more detail below. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

Figure 3:
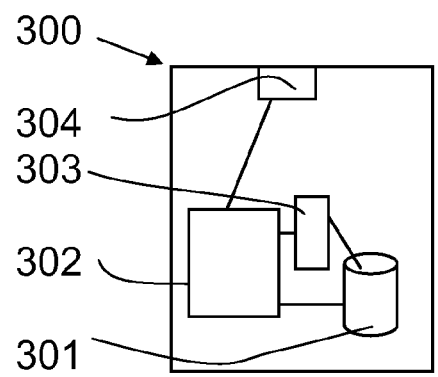
FIG. 3 shows a schematic diagram of a control apparatus according to some embodiments.

FIG. 3 shows an example of a control apparatus for a communication system, for example to be coupled to and/or for controlling one or more stations of an access system. In some embodiments base stations comprise a separate control apparatus. In other embodiments the control apparatus can be another network element. The control apparatus 300 can be arranged to provide control on communications in a service area of the system. The control apparatus can be configured to provide control functions in association with generation and communication of instructions to relevant communication devices and processing of responses from the devices and other related information by means of the data processing facility in accordance with certain embodiments described below. For this purpose the control apparatus 300 comprises at least one memory 301, at least one data processing unit 302, 303 and an input/output interface 304. Via the interface the control apparatus can be coupled to a receiver and a transmitter of a base station. The control apparatus can be configured to execute an appropriate software code to provide the control functions. It shall be appreciated that similar component can be provided in a control apparatus provided elsewhere in the system for controlling reception of sufficient information for decoding of received information blocks.

A non-limiting example of the recent developments in communication system architectures is the long-term evolution (LTE) of the Universal Mobile Telecommunications System (UMTS) that is being standardized by the 3rd Generation Partnership Project (3GPP). Non-limiting examples of appropriate LTE access nodes are a base station of a cellular system, for example what is known as NodeB (NB) in the vocabulary of the 3GPP specifications. The LTE employs a mobile architecture known as the Evolved Universal Terrestrial Radio Access Network (E-UTRAN). Base station nodes of such systems are known as evolved or enhanced Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access).

Figure 4:
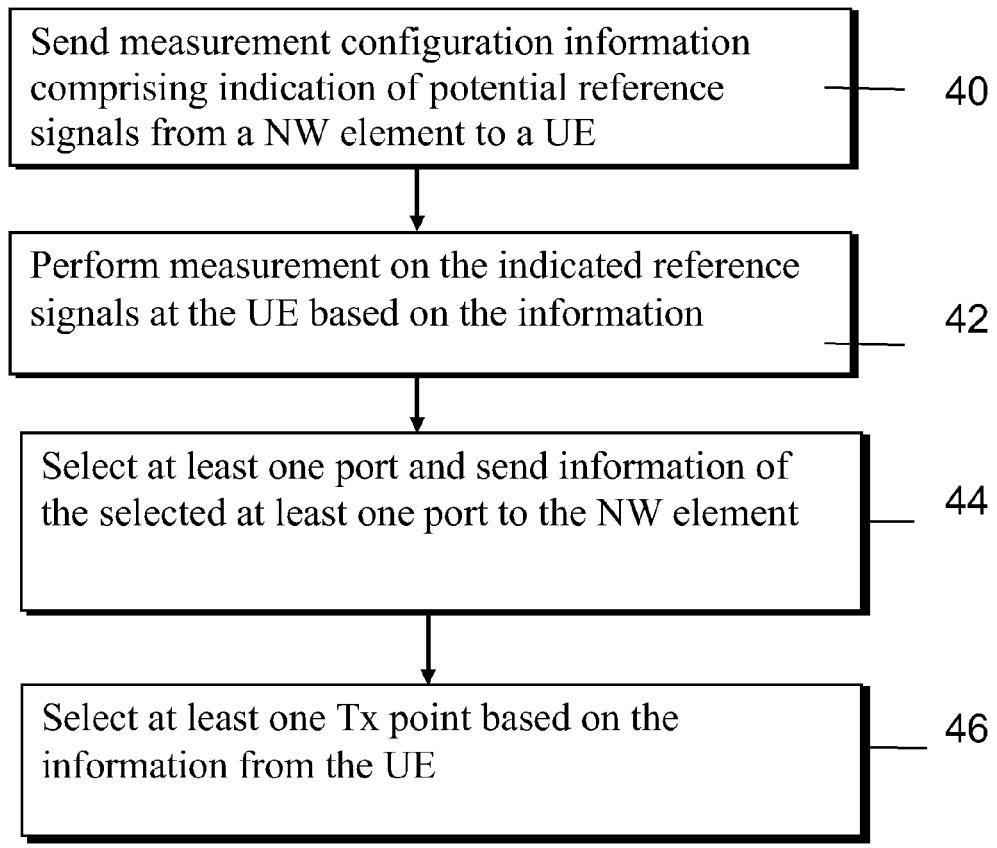
FIG. 4 shows a flow chart according to an embodiment.

FIG. 4 shows a flowchart in accordance with an embodiment where a network element can be adapted for selection of transmission points. The element can send at 40 to a mobile device information of potential reference signal, e.g. regarding appropriate reference signal resources and/or ports to configure the mobile device for measurement of at least one characteristic of the indicated potential reference signals. The at least one characteristic may comprise a characteristic such as received signal power and/or quality.

The mobile device receives the configuration information of potential reference signals and performs at 42 measurements on the indicated potential reference signals. The mobile device can then select at least one port amongst detected ports. The number of port to be selected can be configurable. The mobile device can then send at 44 to the network element information of the selected at least one port. The network element can receive at 46 the information of the port(s) selected by the mobile device and select at least one Tx port based thereon.

In the following a UE assisted transmission point selection mechanism is described in more detail with reference an architecture in accordance with 3GPP specifications and where the reference signal resources comprise potential channel state information reference signals resources. An eNB can configure potential CSI-RS resources/ports for a UE to measure. The UE then report the strongest port(s) to the eNB for point selection.

In accordance with a more detailed example for the signalling and overall operation, an eNB can pre-configure a "Point Selection CSI-RS resource" including multiple candidate CSI-RS ports and sequences through radio resource control (RRC) signalling for UE to perform appropriate measurements. The signalling may include various pieces of information. Examples of possible information will be discussed below.

Time domain periodicity of the CSI-RS may be signalled from the eNB to the UE. An example of this parameter is an index of 0-4 representing periodicity of [5, 10, 20, 40, 80] ms. If a cell covers multiple Tx points with different periodicity, this value can be set to the longest periodicity of the Tx points.

CSI-RS subframe offset search space for UE to perform measurement can also be signalled to the UE. One example of possible signalling to provide is a bitmap of 80 bits: mapping to 80 different offsets when periodicity is 80 ms. For smaller periodicity, some bits may be allowed to be redundant. For example, bit value "1" can be defined indicate that a corresponding offset should be searched by UE. Apparently, the value could be "0", or it can be indicated that an offset should not be searched. Another example is a length of bitmap that is decided based on the timed domain periodicity parameter. For example, it can be defined that if the periodicity is 10 ms, then offset bitmap is 10 bits.

The CSI-RS sequence which the UE should measure may also be send to the UE. The sequence can be associated with an initial input value. Only one sequence may be signalled. The sequence may be implicitly derived from a physical cell identifier (PCI). Alternatively, M sequences can be signalled to the UE for monitoring.

Tx point selection criteria can be signalled to the UE. One example of criteria that can be signalled is a pathloss window. The window size can be defined as Y dB. E.g. acceptable received power of a certain Tx point can be defined as being no more than Y dB lower than that of the strongest point. Parameter Y can also be included in the signalling, having a value of e.g. [3, 6, 9] dB.

The eNB can also define the maximum reported port number. For the purposes of this description this parameter is denoted herein by N.

The UE receives the information and performs measurements and reporting accordingly. In accordance with an embodiment it is assumed that one port comes from one transmission point (TP). The UE can detect the reception power for each CSI-RS port configured by means of the signalling from the eNB. There can be altogether 32 potential CSI-RS RE pairs in each subframe for both two frame structures. In here it is noted that each resource element (RE) pair has two ports transmitted using code division multiplexing (CDM) to separate them, but UE can just perform measurement on the first port, see the table in FIG. 5. In this case the total detection times can be 32*X*M, where X is the total number of "1" bits in the subframe offset bitmap, and M is the number of the configured sequence.

If the UE is aware of the current frame-structure, the UE can measure part of the ports to further reduce its measurement effort. E.g. if the frame structure is based on frequency division duplexing (FDD), the UE may only need to detect the twenty RE pairs. In case of time division duplexing (TDD), detection of thirty two (32) RE pairs may be all that is needed.

If one Tx point has eight (8) antennas, an UE may detect four RE pairs with similar reception power. To avoid a duplicated reporting, an eNB may indicate for the UE to follow a 8Tx CSI-RS pattern for the measurement. Then only eight potential CSI-RS RE pairs need to be detected for each sub-frame. If it is a 4Tx pattern, then this would be sixteen pairs for one sub-frame.

After detection of ports, the UE can selects P CSI-RS ports with strongest reception power. If P has a value of one, then only the strongest port would be selected.

The selected port(s) shall fulfil the selection criteria configured by the eNB signalling. For example, if the path loss window is set to be 3 dB, then only Tx points with received power within the 3 dB window to the strongest detected Tx points are selected. It is noted that other criteria than path loss window can also be used, either in addition or instead of information of path loss. For example, any parameter defining the quality of radio conditions can be used.

Selection of P ports is determined where P<=N is then provided, N being configured by the signalling from the eNB. After the determination the UE can report e.g. the indexes of the selected P CSI-RS ports to eNB through radio resource control (RRC) signalling. Other high layer signalling, for example medium access control (MAC) signalling may also be used for the reporting.

In accordance with an embodiment the report by an UE can include information about P global port indexes. For each port, the total possibility is 20*80*M for FDD and 32*80*M for TDD, where M is the number of sequence as configured by an eNB.

According to an embodiment an eNB can indicate to a UE that multiple CSI-RS ports are from one transmission point (TP). The UE can combine multiple CSI-RS ports from the same TP for received signal quality measurements and reporting. The detailed signalling could be implicit or explicit. For example, an implicit signalling can be provided by an UE assuming that two CSI-RS ports in the same RE group are from the same TP.

A detailed example is now given with reference to the Table in FIG. 5 showing mapping from CSI reference signal configuration to (k',l') for a normal cyclic prefix. In the example it is assumed that a cell has 40 Tx points and that each Tx point has 2 antennas. The eNB configures the same sequence for all Tx points. CSI-RS periodicity is set to 10 ms. Each Tx point is transmitting in a 2 Tx CSI-RS index (0-19) in the Table of FIG. 5. Total of two offset values are used (20*2=40). Only the first two subframes have CSI-RS. Therefore eNB can configure the "Point Selection CSI-RS resource" as follows: Periodicity=10 ms, offset bitmap= [1100000000]. As the periodicity is 10 ms, 10 bits bitmap for offset is considered sufficient. As the reported number of Tx points N=2, the UE measures the reception power from 40 Tx points and reports 2 Tx points with the strongest received power.

The required data processing apparatus and functions of a control apparatus in a network element and a mobile device for the causing configuration, signaling, determinations, and/or control of measurement and reporting for selection of Tx point(s) may be provided by means of one or more data processor. The described functions may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

An appropriately adapted computer program code product or products may be used for implementing the embodiments, when loaded or otherwise provided on an appropriate data processing apparatus. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may be practiced in various components such as integrated circuit modules. The design of integrated circuits is by and large an automated process. Complex and powerful tools are available for converting a logic level design into a semiconductor circuit design ready to be formed on a semiconductor substrate.

Embodiments may provide certain advantages. For example, an eNB can configure the potential reference signal resources to reduce the number of detections required by a mobile device. A delay in detection of the strongest port(s) may be reduced. Since a mobile device can report the strongest port(s) an eNB can be provided with adequate knowledge for transmission point selection.

It is noted that whilst embodiments have been described in relation to LTE, similar principles can be applied to any other communication system where dynamic feedback messaging may be desired. Therefore, although certain embodiments were described above by way of example with reference to certain exemplifying architectures for wireless networks, technologies and standards, embodiments may be applied to any other suitable forms of communication systems than those illustrated and described herein.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. For example, a combination of one or more of any of the other embodiments previously discussed can be provided. All such and similar modifications of the teachings of this invention will still fall within the scope of this invention as defined in the appended claims.

What is claimed is:

1. A method, comprising
sending to a mobile device information of multiple candidates of potential reference signals to configure the mobile device for measurement of at least one received signal characteristic of the indicated multiple candidates of potential reference signals,
receiving information of at least one port selected by the mobile device based on a measurement performed on the at least one received signal characteristic of the multiple candidates of potential reference signals dependent on the measurement configuration; and
selecting transmission points dependent on the received information of the at least one port selected by the mobile device based on the measurement whereby the mobile device assists in selecting the transmission points based on the information of the multiple candidates of potential reference signals sent to the mobile device.

2. A method as claimed in claim 1, wherein the information of potential reference signals comprises potential channel state information reference signals resources or ports.

3. A method as claimed in claim 1, wherein the information of potential reference signals comprises at least one of
time domain periodicity of reference signal resources,
reference signal subframe offset search space,
a reference signal sequence,
transmission point selection criteria,
maximum number of ports to report,
number of ports associated with a transmission point, and
an antenna pattern based on a transmission point with most antennae.

4. A method as claimed in claim 3, wherein the time domain periodicity of the reference signal resources is represented by an index mapping to a different periodicity.

5. A method as claimed in claim 3, wherein the time domain periodicity of the reference signal resources is selected to be the longest periodicity of all transmission points in a relevant area.

6. A method as claimed in claim 3, wherein the reference signal subframe offset search space is defined by a bitmap, the bitmap being of a predefined length or defined based on the time domain periodicity.

7. A method as claimed in claim 3, wherein information of the transmission point selection criteria comprises a range of acceptable path loss and/or definition of an acceptance window.

8. A method as claimed in claim 1, wherein the at least one received signal characteristic comprises received signal power and/or quality.

9. A method as claimed in claim 1, wherein the measurement comprises measuring the at least one characteristic for each of the indicated reference signal by measuring only one port per a resource element.

10. A method as claimed in claim 1, wherein the measurement comprises measuring the at least one characteristic for each of the indicated reference signal by measuring multiple ports per a resource element.

11. A method as claimed in claim 1, wherein only a part of ports indicated by the information of potential reference signals are measured depending on the frame structure.

12. A method as claimed in claim 1, wherein one or more ports with the strongest reception power are selected.

13. A method as claimed in claim 1, comprising combining measurements from a-multiple of ports.

14. A method, comprising
receiving at a mobile device information of multiple candidates of potential reference signals,
performing measurement on at least one received signal characteristic dependent on the information of the indicated multiple candidates of potential reference signals and selecting at least one port based on the measurement, and
sending to a network element information of at least one port selected by the mobile device based on the measurement on the at least one received signal characteristic dependent on the information of the multiple candidates of potential reference signals for assisting in selecting transmission points by the network element dependent on the information sent from the mobile device based on the information of the multiple candidates of potential reference signals received by the mobile device.

15. An apparatus, comprising at least one processor, and at least one memory including computer program code, wherein the at least one memory and the computer program code are configured, with the at least one processor, to cause sending to a mobile device information of multiple candidates of potential reference signals to configure the mobile device for measurement of at least one received signal characteristic of the indicated multiple candidates of potential reference signals, receive from the mobile device information of at least one port selected by the mobile device based on a measurement performed on the at least one received signal characteristic of the multiple candidates of potential reference signals dependent on the measurement configuration; and select transmission points dependent on the received information selected by the mobile device based on the measurement whereby the mobile device assists in selecting the transmission points.

16. An apparatus as claimed in claim 15, wherein the information of potential reference signals comprises at least one of potential channel state information reference signal resources or ports,
time domain periodicity of reference signal resources,
reference signal subframe offset search space,
a reference signal sequence,
transmission point selection criteria,
maximum number of ports to report,
number of ports associated with a transmission point, and
an antenna pattern based on a transmission point with most antennae.

17. An apparatus as claimed in claim 16, configured to map an index to a respective time domain periodicity of the reference signal resources.

18. An apparatus as claimed in claim 16, configured to select the time domain periodicity of the reference signal resources to be the longest periodicity of all transmission points in a relevant area.

19. An apparatus as claimed in claim 16, wherein the reference signal subframe offset search space is defined by a bitmap, the bitmap being of a predefined length or defined based on the time domain periodicity.

20. An apparatus as claimed in claim 16, wherein information of the transmission point selection criteria comprises a range of acceptable path loss and/or definition of an acceptance window.

21. An apparatus as claimed in claim 15, wherein the at least one received signal characteristic comprises received signal power and/or quality.

22. An apparatus as claimed in claim 15, configured to cause measurement of the at least one characteristic for each of the indicated reference signal by measuring only one port per a resource element.

23. An apparatus as claimed in claim 15, configured to cause measurement of the at least one characteristic for each of the indicated reference signal by measuring multiple ports per a resource element.

24. An apparatus as claimed in claim 15, configured to cause measurement only a part of ports indicated by the information of potential reference signals depending on the frame structure.

25. An apparatus as claimed in claim 15, configured to cause the mobile device to select one or more ports with the strongest reception power.

26. An apparatus as claimed in claim 15, configured to combine measurements from a-multiple of ports.

27. A node for a communication system comprising the apparatus as claimed in claim 15.

28. A node as claimed in claim 27, comprising a mobile device or a network element associated with a base station.

29. A communication system comprising an apparatus according to claim 15.

30. An apparatus for transmission point selection, the apparatus comprising at least one processor, and at least one memory including computer program code, wherein the at least one memory and the computer program code are configured, with the at least one processor, to receive information of multiple candidates of potential reference signals,
perform measurement on at least one received signal characteristic dependent on the information of the indicated multiple candidates of potential reference signals, select at least one port based on the measurement, and
cause sending to a network element information of the selected at least one port for assisting in selecting transmission points by the network element dependent on the information sent from the apparatus based on the information of the multiple candidates of potential reference signals received by the apparatus.

31. A computer program product embodied in a non-transitory computer memory and comprising instructions the execution of which by a processor results in performing operations that comprise:

sending to a mobile device information of multiple candidates of potential reference signals to configure the mobile device for measurement of at least one received signal characteristic of the indicated multiple candidates of potential reference signals, receiving information of at least one port selected by the mobile device based on a measurement performed on the at least one received signal characteristic of the multiple candidates of potential reference signals dependent on the measurement configuration; and selecting transmission points dependent on the received information of the at least one port selected by the mobile device based on the measurement whereby the mobile device assists in selecting the transmission points based on the information of the multiple candidates of potential reference signals sent to the mobile device.

* * * * *

UNITED STATES PATENT AND TRADEMARK OFFICE
CERTIFICATE OF CORRECTION

| | |
|---|---|
| PATENT NO. | : 9,456,411 B2 |
| APPLICATION NO. | : 14/386052 |
| DATED | : September 27, 2016 |
| INVENTOR(S) | : Xiaoyi Wang, Chunli Wu and Peter Skov |

Page 1 of 1

It is certified that error appears in the above-identified patent and that said Letters Patent is hereby corrected as shown below:

In the claims

In Claim 13:
Column 10, line 55, "a-multiple" should be deleted and --multiple-- should be inserted.

In Claim 26:
Column 12, line 13, "a-multiple" should be deleted and --multiple-- should be inserted.

Signed and Sealed this
Thirteenth Day of December, 2016

Michelle K. Lee
*Director of the United States Patent and Trademark Office*